United States Patent
Jun

[11] Patent Number: 5,781,250
[45] Date of Patent: Jul. 14, 1998

[54] INPUT SIGNAL SWITCHING CIRCUIT OF A MONITOR AND SWITCHING METHOD THEREOF

[75] Inventor: Il Jin Jun, Kyoungsangbuk-Do, Rep. of Korea

[73] Assignee: LG Electronics Inc., Rep. of Korea

[21] Appl. No.: 751,174

[22] Filed: Nov. 15, 1996

[30] Foreign Application Priority Data

Apr. 16, 1996 [KR] Rep. of Korea ............... 1996-11427

[51] Int. Cl.$^6$ ............................................. H04N 5/268
[52] U.S. Cl. ........................................ 348/706; 248/705
[58] Field of Search ........................... 348/705, 706, 348/554, 555, 556, 558; 345/115, 119, 120, 154; H04N 5/268, 3/27, 5/46

[56] References Cited

U.S. PATENT DOCUMENTS

| | | | |
|---|---|---|---|
| 4,903,129 | 2/1990 | Bell et al. | 348/706 |
| 5,091,784 | 2/1992 | Someya et al. | 358/183 |
| 5,258,839 | 11/1993 | Bae | 348/473 |
| 5,287,186 | 2/1994 | Takamori | 348/705 |
| 5,345,272 | 9/1994 | Ersoz et al. | 348/561 |
| 5,526,017 | 6/1996 | Wilkie | 348/598 |
| 5,648,799 | 7/1997 | Kikinis | 348/730 |

*Primary Examiner*—Mark R. Powell
*Assistant Examiner*—Vivek Srivastava
*Attorney, Agent, or Firm*—Oppenheimer Wolff & Donnelly LLP

[57] ABSTRACT

An automatic input signal switching circuit of a monitor having a BNC (binary number code) signal terminal and a D-sub (D type-sub miniature connector) signal terminal and a switching method thereof, the circuit having a video signal switch receiving video signals from the BNC signal terminal and the D-sub signal terminal, a video signal processor receiving one of the video signals from the BNC signal terminal and the D-sub signal terminal, the received video signal being selected at the video signal switch, a synchronization signal switch receiving a vertical synchronization signal and a horizontal synchronization signal from the BNC signal terminal and a vertical synchronization signal and a horizontal synchronization signal from the D-sub signal terminal, a detector receiving a detection signal representing a connection state between the D-sub signal terminal and a personal computer, a microcomputer receiving an output of the detector, for generating a control signal, and a switching controller receiving the control signal, for controlling the video signal switch and the synchronization signal switch.

8 Claims, 5 Drawing Sheets

FIG. 3A

| ST-in | ST | RESULT |
|---|---|---|
| LOW | HIGH | D-sub CONNECTION |
| HIGH | LOW | D-sub NO CONNECTION |

FIG. 3B

| INPUT | | OUTPUT | | RESULT |
|---|---|---|---|---|
| BD-out | S (Sa, Sb, Sc) | $Y_0 - Z$ | $Y_1 - Z$ | |
| HIGH | LOW | ON | OFF | D-sub |
| LOW | HIGH | OFF | ON | BNC |

FIG. 3C

| INPUT | | OPER. MODE | OUTPUT OF POWER SAVING MODE | |
|---|---|---|---|---|
| H | V | | MODE 1 | MODE 2 |
| O | O | NOR. MODE | L (H) | L (H) |
| X | O | POWER SAVING MODE 1 | H (L) | L (H) |
| O | X | POWER SAVING MODE 1 | L (H) | H (L) |
| X | X | POWER SAVING MODE 2 | L (H) | L (H) |
| | | SELF TEST MODE | | |

FIG. 4

| | INPUT | | OPERATION |
| --- | --- | --- | --- |
| | D-sub | BNC | |
| A | NO | NO | a) BNC : BNC → D-sub → BNC → POWER SAVING MODE<br>b) D-sub : D-sub → BNC → D-sub ⎡ ST-in = 1 → SELF TEST MODE<br>⎣ ST-in = 0 → POWER SAVING MODE |
| B | NO | YES | c) BNC : BNC<br>d) D-sub : D-sub → BNC |
| C | YES | NO | e) BNC : BNC → D-sub<br>f) D-sub : D-sub |
| D | YES | YES | g) SELECTION BY A USER |

INPUT SIGNAL SWITCHING CIRCUIT OF A MONITOR AND SWITCHING METHOD THEREOF

BACKGROUND OF THE INVENTION

1. Field of the Invention

The present invention is directed to an input signal switching circuit of a monitor and a switching method thereof, more particularly to an automatic input signal switching circuit of the monitor having a BNC (binary number code) signal terminal and a D-sub (D type-sub miniature connector) signal terminal and a switching method thereof.

2. Description of the Prior Art

Referring to FIG. 1 showing a conventional input signal switching circuit of a monitor, video signals R, G and B and horizontal and vertical synchronization signals H and V of a BNC input terminal and a D-sub input terminal are connected to terminals a and b of a switch SW1, respectively. Either the BNC signal or the D-sub signal is selected. The selected signal is connected to a common terminal c of the switch SW1 and then transmitted to a video signal and synchronization signal processor 1.

In case the input signal is converted from the D-sub signal to the BNC signal and vice versa, an automatic switching is not made at the switch SW1 and a manual switching is required.

SUMMARY OF THE INVENTION

An object of a present invention is to provide an automatic input signal switching circuit of a monitor having two input terminals and a switching method thereof.

In view of the object of the present invention, there is provided an automatic input signal switching circuit of a monitor having a BNC signal terminal and a D-sub signal terminal, the circuit comprising a video signal switching part receiving a video signal of the BNC signal terminal and a video signal of the D-sub signal terminal, a video signal processing part receiving one of the video signal from the BNC signal terminal and the video signal from the D-sub signal terminal, the one video signal being selected at the video signal switching part, a synchronization signal switching part receiving a horizontal synchronization signal and a vertical synchronization signal from the BNC signal terminal and a vertical synchronization signal and a horizontal synchronization signal from the D-sub signal terminal, a detecting part receiving a detection signal representing a connection state between the D-sub signal terminal and a personal computer, a microcomputer receiving an output of the detecting part, for generating a control signal and a switching control part receiving the control signal, for controlling the video signal switching part and the synchronization signal switching part. Wherein the detecting part and the switching control part each comprises an element, such as a transistor or a diode, connected to a voltage terminal and a ground and turned on/off according to the detection signal or the control signal.

In view of another object of the present invention, there is provided an automatic input signal switching method of a monitor having a BNC signal terminal and a D-sub signal terminal, the method comprising the steps of (a) determining whether or not a horizontal synchronization signal of a BNC signal of the BNC signal terminal or a D-sub signal of the D-sub signal terminal is inputted to a microcomputer, (b) determining whether or not a vertical synchronization signal of the BNC signal from the BNC signal terminal or the D-sub signal from the D-sub signal terminal is inputted to the microcomputer, (c) operating the monitor in a first mode by a control of the microcomputer if the horizontal synchronization signal and the vertical synchronization signal are inputted at steps (a) and (b), (d) operating the monitor in a second mode by a control of the microcomputer if either the horizontal synchronization signal or the vertical synchronization signal is inputted at steps (a) and (b), (e) storing an initial connection state of the BNC signal terminal or the D-sub signal terminal in the microcomputer and modifying a logic output level of the microcomputer to change the initial connection state if both the horizontal synchronization signal and the vertical synchronization signal are not inputted at steps (a) and (b), (f) after step (e), increasing a timer of a predetermined period checking an input state of the horizontal synchronization signal and the vertical synchronization signal and a modification mode checking the horizontal synchronization signal and the vertical synchronization signal inputted to the microcomputer by modifying the logic output level of the microcomputer and then operating the monitor in a third mode, (g) repeating the steps (a) and (b) and performing one step of steps (c), (d) and (e) in accordance with a result thereof and (h) operating the monitor in the third mode if the D-sub signal terminal is connected to a personal computer connected to the monitor and operating the monitor in a fourth mode if the D-sub signal terminal is not connected to the personal computer connected to the monitor, at a D-sub signal connection state during the step(e). Wherein the first mode is a normal mode, the second mode is a power saving mode 1, the third mode is a power saving mode 2 and the fourth mode is a self test mode.

BRIEF DESCRIPTION OF THE INVENTION

The advantages and object of the present invention will become apparent by explaining the embodiment of the present invention referring to the attached drawings.

FIGS. 3A, 3B and 3C are tables illustrating a connection state between a personal computer and a D-sub signal, a signal switching state therebetween and a definition of an operation mode, respectively.

FIG. 4 is a table showing an operation state of the input signal switching circuit of the present invention in accordance with the signal inputted to the monitor.

DETAILED DESCRIPTION OF THE EMBODIMENT

Figure 1:
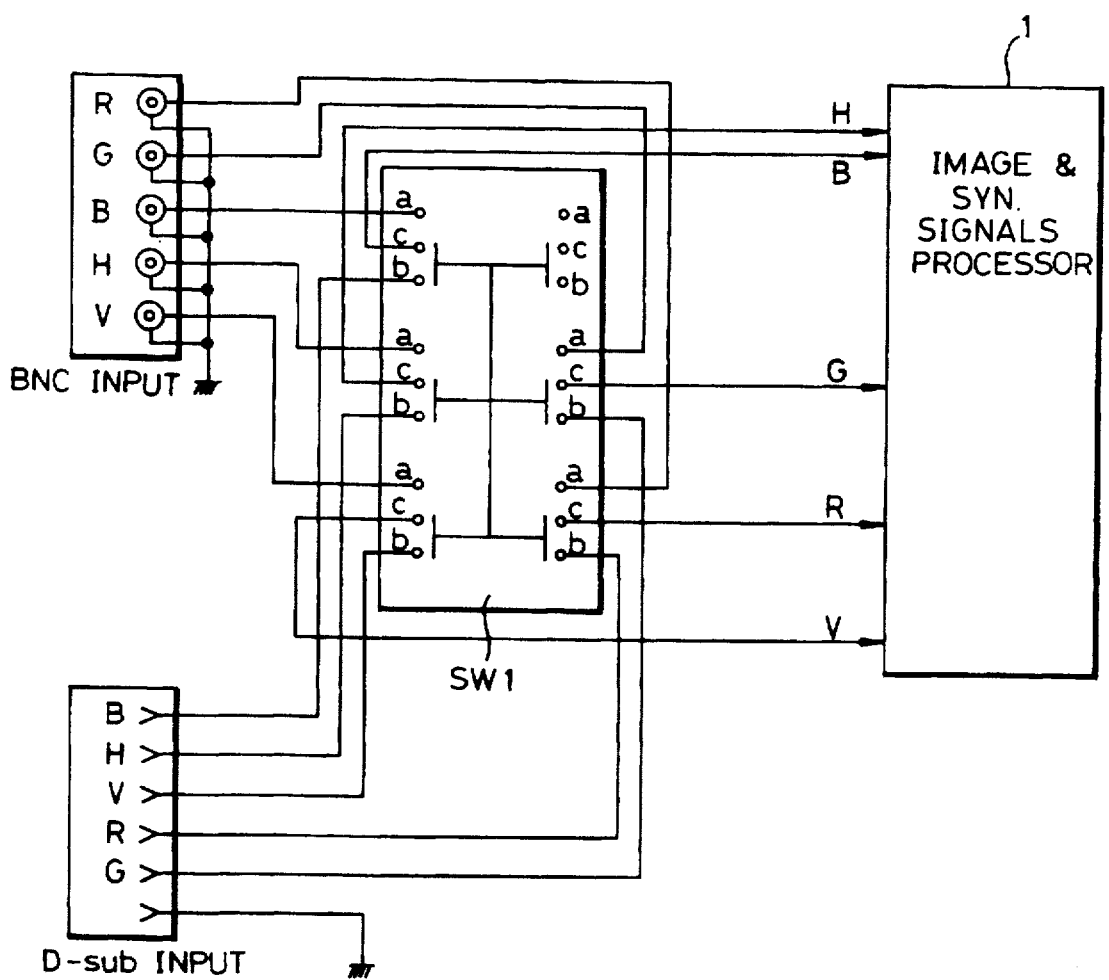
FIG. 1 shows a conventional input signal switching circuit of a BNC signal and a D-sub signal in a monitor.
Figure 2:
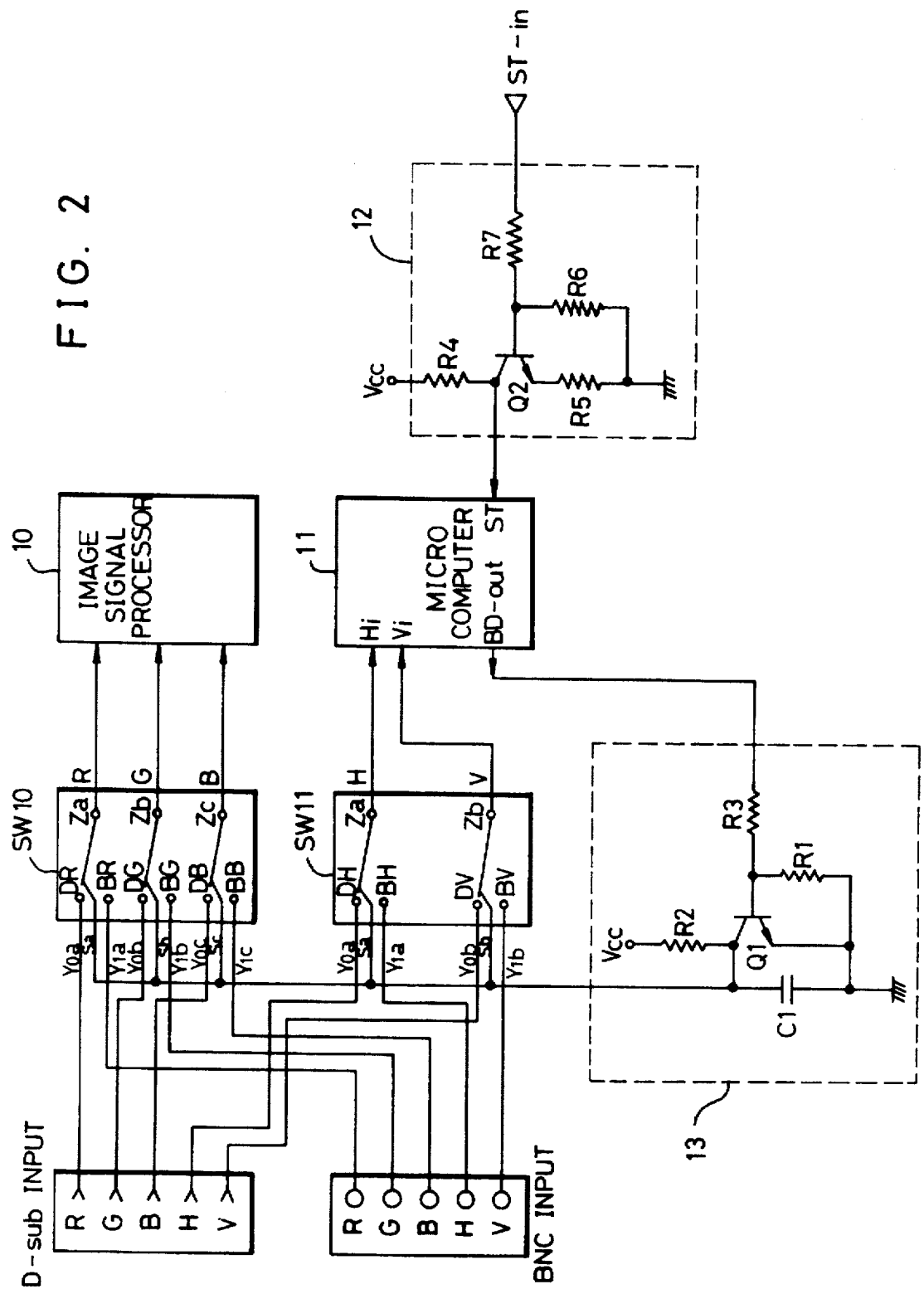
FIG. 2 shows an input signal switching circuit of a BNC signal and a D-sub signal in a monitor according to the present invention.

An automatic input signal switching circuit of a D-sub signal and a BNC signal, as shown in FIG. 2, includes a video signal switch SW10 receiving video signals from a BNC signal terminal and a D-sub signal terminal, a video signal processor 10 receiving from the video signal switch SW1 a selected signal among the BNC signal and the D-sub signal, a synchronization signal switch SW11 receiving a vertical and a horizontal synchronization signals of the BNC signal and the D-sub signal, a detector 12 receiving a detection signal representing a connection state between the D-sub signal and a personal computer, a microcomputer 11 receiving the detection signal, for generating a control signal and a switching controller 13 for controlling the video signal switch SW10 and the synchronization signal switch SW11.

The detector 12 has a transistor Q2 receiving a signal from a self-test terminal ST-in and connected to a voltage terminal and a ground and four resistors R4, R5, R6 and R7. The switching controller 13 also has a transistor Q1 receiving an output from the microcomputer 11 and connected to the voltage terminal and the ground, three resistors R1, R2 and R3 and a capacitor C1. Instead of the transistor used in the detector 12 and the switching controller 13, a diode can be served.

An operation of the present invention will be described with reference to the FIGS. 2, 3A through 3C and 5.

In an initial state, a horizontal synchronization signal and a vertical synchronization signal of a BNC signal or a D-sub signal are not inputted in a microcomputer 11 and an output of the microcomputer 11 is in a given logic level. For example, if a signal from an output terminal BD-out of the microcomputer 11 is logic "high", a switching controller 13 controls a video signal switch SW10 and a synchronization signal switch SW11, applying the video signal, the horizontal synchronization signal and the vertical synchronization signal of the D-sub signal to the video signal processor 10 and the microcomputer 11 as shown in FIG. 3B. On other hand, if the signal from the output terminal BD-out of the microcomputer 11 is logic "low", the switching controller 13 controls the video signal switch SW10 and the synchronization signal switch SW11, applying the video signal, the horizontal synchronization signal and the vertical synchronization signal of the BNC signal to the video signal processor 10 and the microcomputer 11. The microcomputer 11 checks whether or not the input of the horizontal synchronization signal and/or the vertical synchronization signal to the microcomputer 11 is normally made so as to classify three cases according to the checked result. The first case is that both the horizontal synchronization signal and the vertical synchronization signal are inputted, the second case is that either the horizontal synchronization signal or the vertical synchronization signal is inputted and the third case is that neither the horizontal synchronization signal nor the vertical synchronization signal is inputted. In the first case, the monitor operates in a normal mode, in the second case in a power saving mode 1 and in the third case in a power saving mode 2. The normal mode is of 100% power consumption, the power saving mode 1 is of less 50% power consumption and the power saving mode 2 is of less 5% power consumption (FIG. 3C).

If an initial control signal, an output of the microcomputer 11, is of logic "high", the logic level of nodes Sa, Sb and Sc is "low" and a horizontal synchronization signal and a vertical synchronization signal of the D-sub signal is applied to the microcomputer 11. Here, if both the horizontal synchronization signal and the vertical synchronization signal are inputted, the monitor operates in the normal mode (steps 20, 21, 22 and 23 of FIG. 5). However, if only either the horizontal synchronization signal or the vertical synchronization signal is inputted, the monitor operates in the power saving mode 1 (steps 21, 22 and 25; 21, 24 and 25 of FIG. 5). Also, if neither the horizontal synchronization signal nor the vertical synchronization signal is inputted, the monitor operates in the power saving mode 2 (steps 21, 24 and 27–34 of FIG. 5).

When neither the horizontal synchronization signal nor the vertical synchronization signal is inputted, the microcomputer 11 stores a present connection state of the BNC signal or the D-sub signal at the synchronization signal switch SW11 (step 29 of FIG. 5) and changes the output level thereof to logic "low", controlling the switching controller 13. Therefore, the D-sub signal connection is converted to the BNC signal connection (steps 30 and 31 of FIG. 5). After increasing the modifying timer checking whether or not the input of the vertical and/or the horizontal synchronization signal is made and the modification mode for modifying the output level of the microcomputer (steps 33 of FIG. 5), the microcomputer operates the monitor in the power saving mode 2 (steps 34 of FIG. 5).

Figure 5:
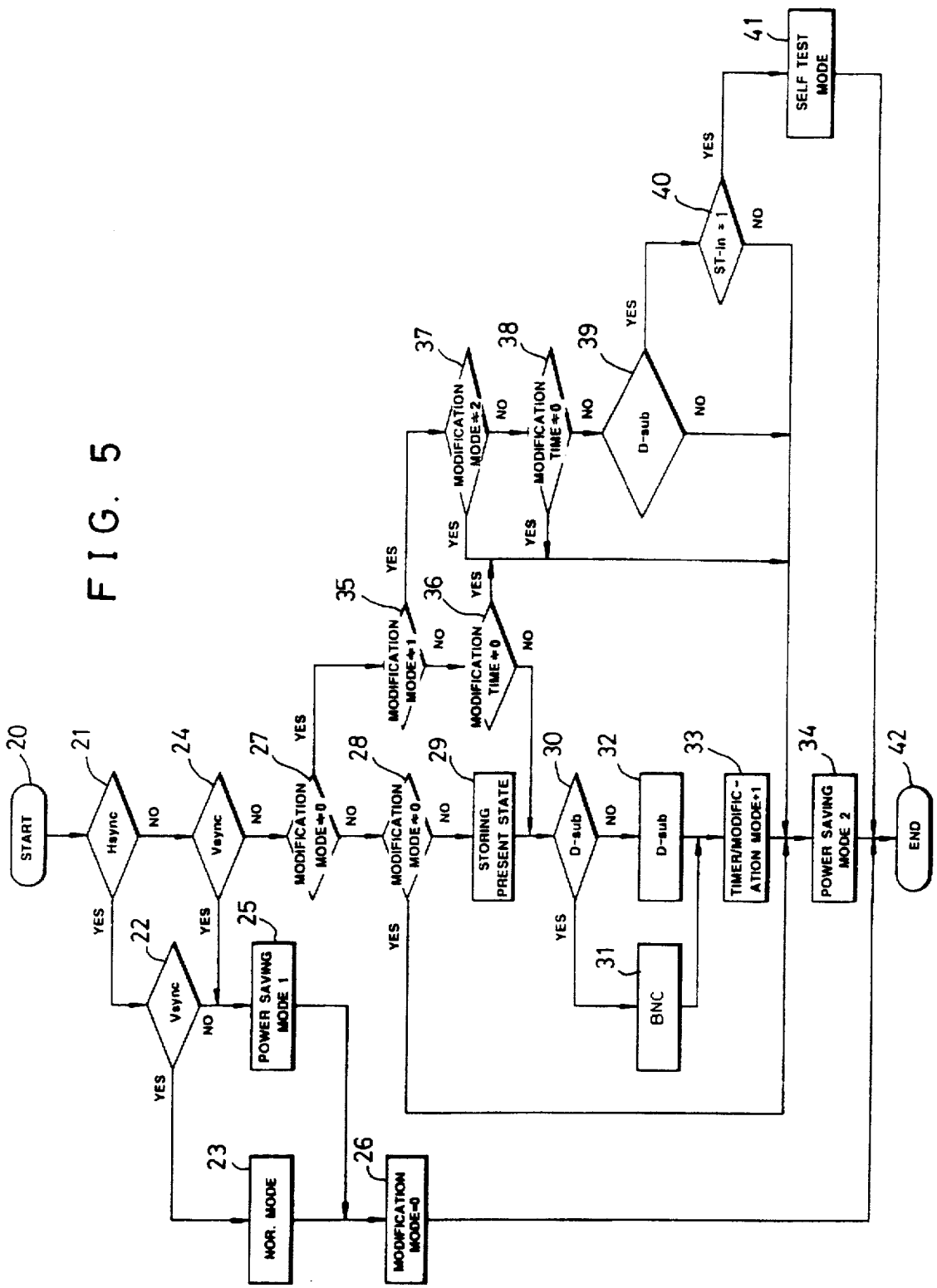
FIG. 5 is a flow chart showing a switching method of a BNC signal and a D-sub signal in a monitor according to the present invention.

Then, the repetition of the above described steps is made after returning to the starting step (step 20 of FIG. 5). That is, during the power saving mode 1 or the power saving mode 2, if both the horizontal synchronization signal and the vertical synchronization signal are inputted the monitor operates in the normal mode, maintaining the BNC connection, and if either the horizontal synchronization signal or the vertical synchronization signal is inputted, the monitor maintains the power saving mode 1. Also, if the input of both the horizontal synchronization signal and the vertical synchronization signal is not detected at the microcomputer, the microcomputer stores a present connection state (steps 21, 24, 27, 35, 36 and 30 of FIG. 5) and converts the BNC connection state to the D-sub connection state (step 32 of FIG. 5). The timer and the modification mode are increased and the monitor operates in the power saving mode 2. Then, the repetition of the above described steps is made after returning to the starting step (step 20 of FIG. 5), if during which neither the horizontal synchronization signal nor the vertical synchronization signal is detected at the microcomputer, the monitor operates in the self test mode or the power saving mode 2 in accordance with the logic level of the self test terminal ST-in. As shown in FIG. 3A, if the logic level of the self test terminal ST-in is logic "low", that is the self test terminal is connected to the personal computer, the microcomputer operates the monitor in the power saving mode 2 and if the logic level of the self test terminal ST-in is logic "high", that is the self test terminal is not connected to the personal computer, the microcomputer operates the monitor in the self test mode (FIG. 3C).

The above description can be similarly applicable to a case that the initial control signal from the microcomputer is logic "low".

FIG. 4 shows case A where both the BNC signal and the D-sub signal are not inputted to the monitor, cases B and C where either the BNC signal or the D-sub signal is inputted and case D where both the BNC signal and the D-sub signal are inputted.

Referring to case A, where the initial output signal of the microcomputer is logic "high" the D-sub signal terminal is connected to the microcomputer 11. However, since the D-sub signal is not applied to the microcomputer, the horizontal and vertical synchronization signals of the D-sub signal are not delivered to the microcomputer 11. Accordingly, the D-sub connection state is changed to the BNC connection state by modifying the output level of the microcomputer and then the microcomputer again checks whether or not the horizontal and the vertical synchronization signals are applied thereto after increasing the timer and the modification mode. Here, since the horizontal and the vertical synchronization signals of the BNC signal are not applied to the microcomputer 11, the connection state is stored and is changed to the D-sub connection and the monitor is operated in the power saving mode 2. On other hand, in case the initial state is the D-sub connection, as described above, the monitor is operated in the self test mode or in the power saving mode 2 in accordance with the logic level of the self test terminal ST-in.

Referring to case B, where the initial output signal of the microcomputer is logic "high" the D-sub signal terminal is connected to the microcomputer 11. Here, since the signal inputted to the microcomputer is not the D-sub signal but the BNC signal, even if the D-sub signal terminal is connected to the microcomputer the horizontal and the vertical synchronization signals of the D-sub signal are not inputted to the microcomputer. Accordingly, the D-sub connection state is changed to the BNC connection state by modifying the output level of the microcomputer and then the microcomputer again checks whether or not the horizontal and the vertical synchronization signals are applied thereto after increasing the timer and the modification mode. Here, the input of the horizontal and the vertical synchronization signals of the BNC signal to the microcomputer 11 is detected, operating the monitor in the normal mode while maintaining the BNC connection state.

Case C illustrates that the D-sub signal is inputted to the microcomputer and the BNC signal is not inputted thereto. Where the level of the microcomputer is logic "high", the D-sub connection state is maintained and the monitor operates in the normal mode since the horizontal and the vertical synchronization signals of the D-sub signal are applied to the microcomputer.

Referring to case D, the horizontal and the vertical synchronization signals of the BNC signal and the D-sub signal are connected to the microcomputer. Therefore, a user can connect either the D-sub signal terminal or the BNC signal terminal to the monitor by selecting an item of an on screen menu.

The case in which the initial output of the microcomputer is logic "low" is similarly explained. In other words, b), d), f) and g) in FIG. 4 are explained in case the initial output of the microcomputer is logic "high" while a), c), e) and g) in FIG. 4 are explained in case the initial output of the microcomputer is logic "low".

As described above, when the video signal and the horizontal and the vertical synchronization signals are inputted through the BNC signal terminal and the D-sub signal terminal provided with the monitor, the microcomputer determines whether or not the input of the horizontal and the vertical synchronization signals is made and automatically switches the D-sub connection to the BNC connection or vice versa according to the determination.

What is claimed is:

1. An automatic input signal switching circuit of a monitor having a BNC signal terminal and a D-sub signal terminal, said circuit comprising:

a video signal switching part receiving a video signal from said BNC signal terminal and a video signal from said D-sub signal terminal;

a video signal processing part receiving one of said video signal from said BNC signal terminal and said video signal from said D-sub signal terminal, said received video signal being selected at said video signal switching part;

a synchronization signal switching part receiving a vertical synchronization signal and a horizontal synchronization signal from said BNC signal terminal and a vertical synchronization signal and a horizontal synchronization signal from said D-sub signal terminal;

a detecting part receiving a detection signal representing a connection state between said D-sub signal terminal and a personal computer;

a microcomputer receiving an output of said detecting part, for generating a control signal; and a switching control part receiving said control signal, for controlling said video signal switching part and said synchronization signal switching part.

2. A circuit as claimed in claim 1, wherein said detecting part comprises an element connected to a voltage terminal and a ground and turned on/off according to said detection signal.

3. A circuit as claimed in claim 2, wherein said element is one selected from a group consisting of a transistor and a diode.

4. A circuit as claimed in claim 1, wherein said switching control part comprises an element connected to a voltage terminal and a ground and turned on/off according to said control signal.

5. A circuit as claimed in claim 4, wherein said element is one selected from a group consisting of a transistor and a diode.

6. A circuit as claimed in claim 1, wherein said one is selected at said synchronization signal switching part in accordance with a logic level of an output of said switching control part.

7. An automatic input signal switching method of a monitor having a BNC signal terminal and a D-sub signal terminal, said method comprising the steps of:

(a) determining whether or not a horizontal synchronization signal of a BNC signal of said BNC signal terminal or a D-sub signal of said D-sub signal terminal is inputted to a microcomputer;

(b) determining whether or not a vertical synchronization signal of said BNC signal of said BNC signal terminal or said D-sub signal of said D-sub signal terminal is inputted to said microcomputer;

(c) operating said monitor in a first mode by a control of said microcomputer if said horizontal synchronization signal and said vertical synchronization signal are inputted at steps (a) and (b);

(d) operating said monitor in a second mode by a control of said microcomputer if either said horizontal synchronization signal or said vertical synchronization signal is inputted at steps (a) and (b);

(e) storing an initial connection state of said BNC signal terminal or said D-sub signal terminal in said microcomputer and modifying a logic output level of said microcomputer to change said initial connection state if both said horizontal synchronization signal and said vertical synchronization signal are not inputted at steps (a) and (b);

(f) after step(e), increasing a timer of a predetermined period checking an input state of said horizontal synchronization signal and said vertical synchronization signal and a modification mode checking said horizontal synchronization signal and said vertical synchronization signal inputted to said microcomputer by modifying said logic output level of said microcomputer and then operating said monitor in a third mode;

(g) repeating said steps (a) and (b) and performing one step of steps (c), (d) and (e) in accordance with a result thereof; and (h) operating said monitor in said third mode if said D-sub signal terminal is connected to a personal computer connected to said monitor and operating said monitor in a fourth mode if said D-sub signal terminal is not connected to said personal computer connected to said monitor, at D-sub signal connection state during said step(e).

8. A method as claimed in claim 7, said first mode is a normal mode of 100% power consumption, said second mode is a power saving mode 1 of less 50% power consumption, said third mode is a power saving mode 2 of less 5% power consumption and said fourth mode is a self test mode.

* * * * *